(12) United States Patent
Hedlund et al.

(10) Patent No.: US 7,125,134 B1
(45) Date of Patent: Oct. 24, 2006

(54) SWITCH ENABLED INFRARED LIGHTING SYSTEM WITH NON-IR LIGHT ELIMINATION

(75) Inventors: Dean Hedlund, Roseau, MN (US); Brad Teubner, Roseau, MN (US); Ryan Sorenson, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 232 days.

(21) Appl. No.: 10/686,142

(22) Filed: Oct. 15, 2003

(51) Int. Cl.
*F21V 21/084* (2006.01)

(52) U.S. Cl. .......................... 362/106; 362/72; 315/77

(58) Field of Classification Search ............ 315/77–82; 307/9.1, 10.1, 10.8; 362/106, 72, 802, 27; 340/468, 479
See application file for complete search history.

(56) References Cited

U.S. PATENT DOCUMENTS

| | | | |
|---|---|---|---|
| 4,277,819 A | 7/1981 | Sobota et al. | 362/80 |
| 4,580,196 A | 4/1986 | Task | 362/62 |
| 4,947,044 A | 8/1990 | Pinson | 250/330 |
| 5,113,175 A * | 5/1992 | Adell | 340/468 |
| 5,347,119 A | 9/1994 | Connors | 250/214 VT |
| 5,685,637 A | 11/1997 | Chapman et al. | 362/263 |
| 5,704,707 A * | 1/1998 | Gebelein et al. | 362/106 |
| 6,236,307 B1 * | 5/2001 | Kurano | 340/426.28 |
| 6,247,825 B1 | 6/2001 | Borkowski | 362/23 |
| 6,429,429 B1 | 8/2002 | Fohl et al. | 250/353 |
| 6,538,820 B1 | 3/2003 | Fohl et al. | 359/625 |
| 6,714,340 B1 * | 3/2004 | Wright | 359/296 |
| 6,803,574 B1 * | 10/2004 | Abel et al. | 250/330 |
| 6,891,563 B1 * | 5/2005 | Schofield et al. | 348/148 |
| 2003/0025078 A1 | 2/2003 | Yamaguchi et al. | 250/330 |
| 2003/0066965 A1 | 4/2003 | Abel et al. | 250/330 |
| 2003/0142850 A1 | 7/2003 | Eggers et al. | 382/104 |

OTHER PUBLICATIONS

*Special Operations Technology Online Edition, Zoom Zoom,* Scott R. Gourley, vol. 1. Issue 1 (May 25, 2003) pp. 1-9 [online] [Retrieved on Sep. 30, 2003] Retrieved from http://www.sotech-kmi.com/archive_article.cfm?DocID=122.

* cited by examiner

*Primary Examiner*—Wilson Lee
(74) *Attorney, Agent, or Firm*—Baker & Daniels LLP

(57) ABSTRACT

The present invention provides a vehicle IR lighting system where manual actuation of a single switch both activates vehicle IR lights and automatically disables all non-IR vehicle lights. The IR lighting system provides a single switch enabling an IR light source and contemporaneously disabling all non-IR light sources. The output of a manual IR light switch is connected as the control line to a relay switch. When the manual IR light switch is closed thus connecting power to the IR light, the output opens the relay connected between vehicle power and the non-IR vehicle lights thus automatically turning off power to all non-IR vehicle lights.

33 Claims, 8 Drawing Sheets

SWITCH ENABLED INFRARED LIGHTING SYSTEM WITH NON-IR LIGHT ELIMINATION

TECHNICAL FIELD

The invention relates to a vehicle with an infrared lighting system for use with night vision viewing devices. Specifically, the invention relates to an infrared (IR) lighting system where a switch activates IR lights and contemporaneously extinguishes all non-IR lights.

BACKGROUND

It has now become common practice to utilize night vision imaging systems (NVIS) including night vision goggles (NVG) to conduct night or low-light operations. Currently, night vision imaging systems include either goggles (which are "binocular" or "monocular") which are worn by an operator, and which respond to visible and near-infrared light having wavelengths up to 930 nanometers. As is conventional, the night vision imaging systems typically generate a visible, phosphor-screen image from normally imperceptible radiation.

While night vision imaging systems are very useful they are not tolerant of high levels of visible light or infrared radiation. In other words, night vision imaging systems are best when employed in actual low light conditions.

When an operator is operating a vehicle, such as, without limitation, aircraft, watercraft, or land-based vehicles, the night vision imaging systems may be useful for night operations; however, it is not uncommon for the vehicle to include sources of visible light or infrared radiation, which interfere with the operation of the night vision imaging system. High intensity visible light or high intensity infrared radiation, which is within the operating range of the night vision imaging system, saturates the night vision imaging system and impedes the effective utilization of the night vision imaging system, sometimes rendering such devices essentially useless. Consequently, illuminated displays and other sources of light, which are necessary for low light operation of communication and control equipment must be neutralized in order to render night vision imaging systems useful for low light operations conducted from a vehicle.

The present invention is of general applicability to all vehicles which may be utilized during low light operations which would benefit from the use of night vision imaging systems, and is not limited to all terrain vehicles (ATV); however, for purposes of exposition only, the specification contained herein will discuss primarily ATVs.

SUMMARY

The invention overcomes the problems of the prior art.

DETAILED DESCRIPTION

Figure 1:
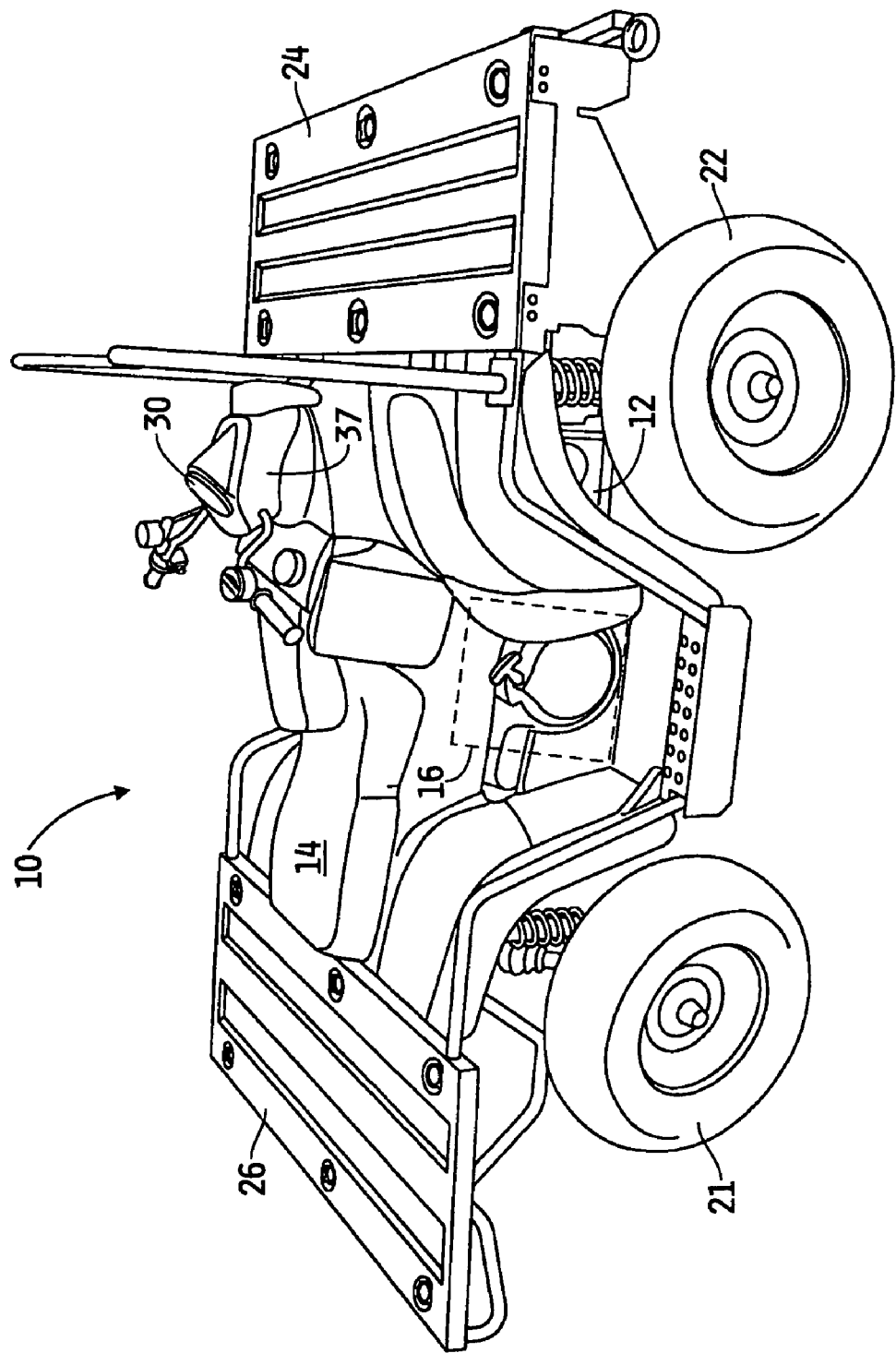
FIG. 1 is a perspective view of an ATV according to an embodiment of the present invention.

The following detailed description is to be read with reference to the figures, in which like elements in different figures have like reference numerals. The figures, which are not necessarily to scale, depict selected embodiments and are not intended to limit the scope of the invention. Skilled artisans will recognize the examples provided herein have many useful alternatives falling within the scope of the invention.

FIG. 1 is a perspective view of an ATV according to a preferred embodiment of the present invention. An ATV 10 has a chassis 12 upon which is mounted an engine 16, a transmission system including front and rear axles, shock absorbers, and front wheel and rear wheel 22, 21. ATV 10 has a straddled seat 14 and a front and rear rack 24, 26 for carrying loads and a handlebar assembly 37. An instrument cluster 30 is located on the chassis 12 where the operator of the vehicle can view it. While the invention is described with reference to an ATV, the invention is not so limited and can be used with many other vehicles such as snowmobiles, cars, trucks, aircraft, motorcycles, and watercraft without departing from the spirit of the present invention.

Figure 2:
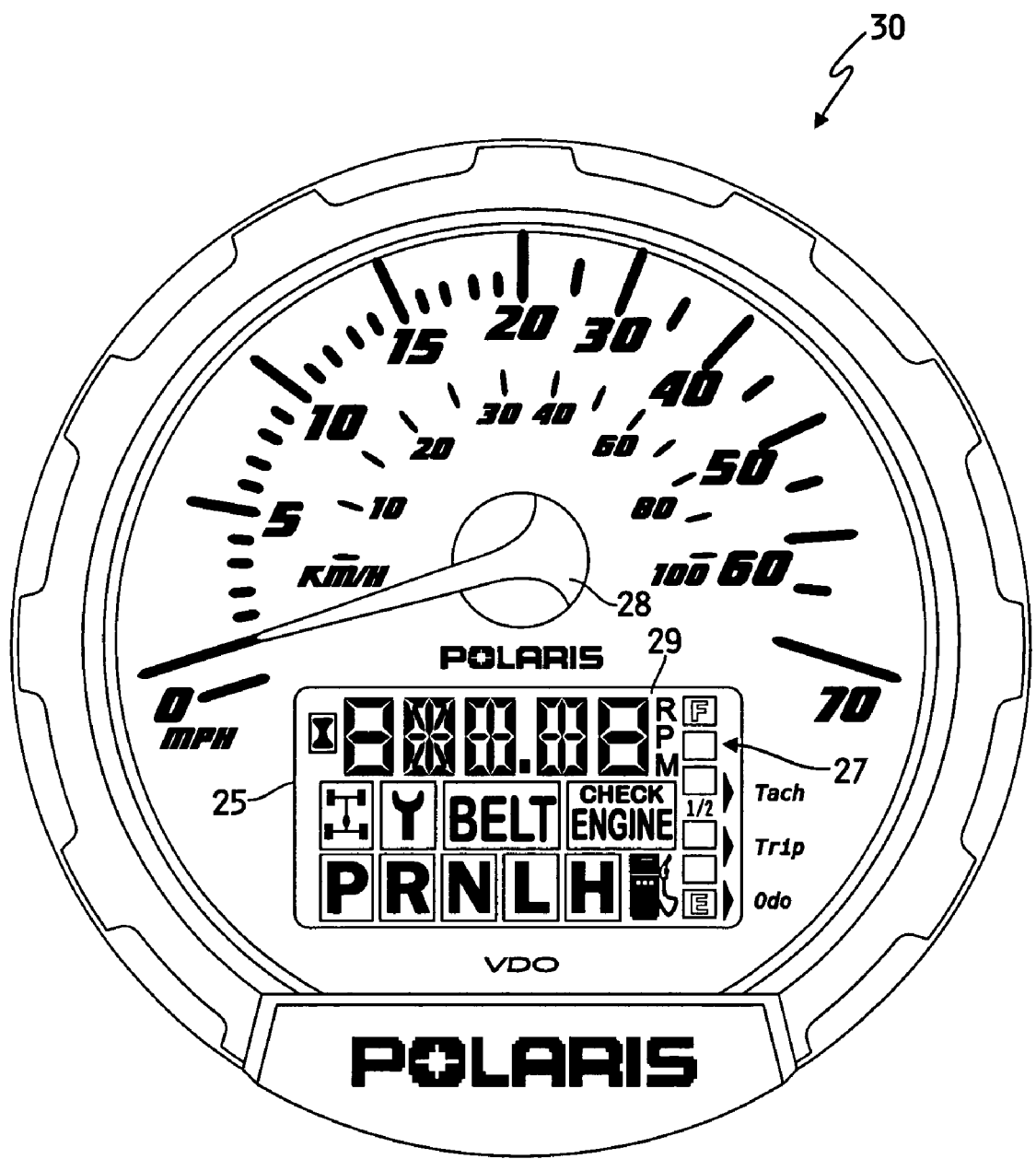
FIG. 2 is a pictorial representation of an ATV instrument cluster according to an embodiment of the present invention.

With reference to FIG. 2, a pictorial representation of an ATV instrument cluster according to an embodiment of the present invention is shown. ATVs typically contain some type of centralized instrument cluster 30 for an operator to view ATV-operating parameters such as speed (speedometer 28), engine RPM (tachometer 29), fuel level 27, oil pressure, etc. and to view certain warning indicator lights or icons that illuminate when certain conditions are detected (e.g., low fuel, engine overheating, generator failure, etc.). Such operating parameters and/or warning indicators are often displayed on an LCD display unit 25. In a low light environment, such as nightfall, instrument cluster 30 is illuminated by a light source when the operator powers on the ATV's non-IR lighting. Generally, cluster 30 is illuminated by a backlight which allows the operator to view cluster 30, including speedometer 28 which is a light pipe illuminated by the backlight during low light conditions.

Figure 3:
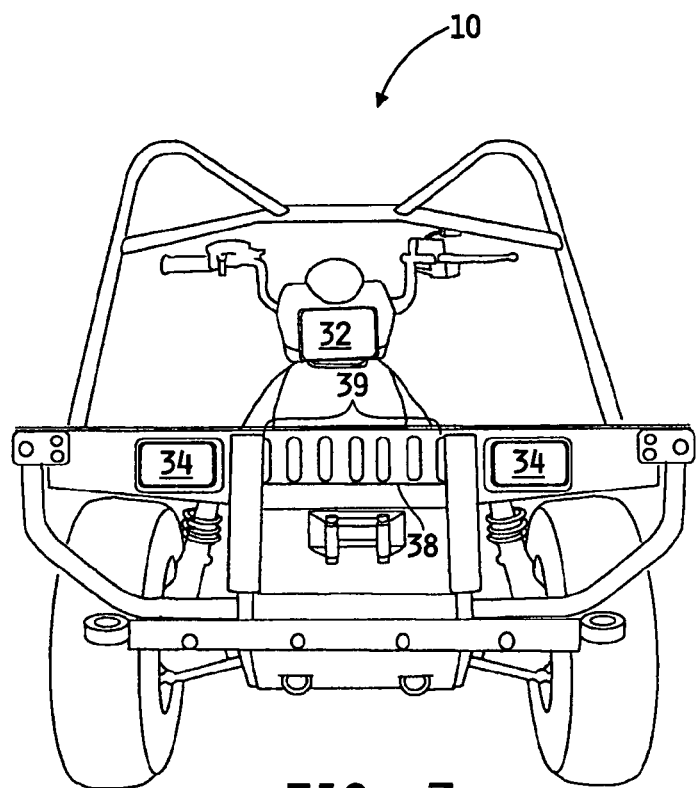
FIG. 3 is a front profile view of an ATV according to an embodiment of the present invention.
Figure 4:
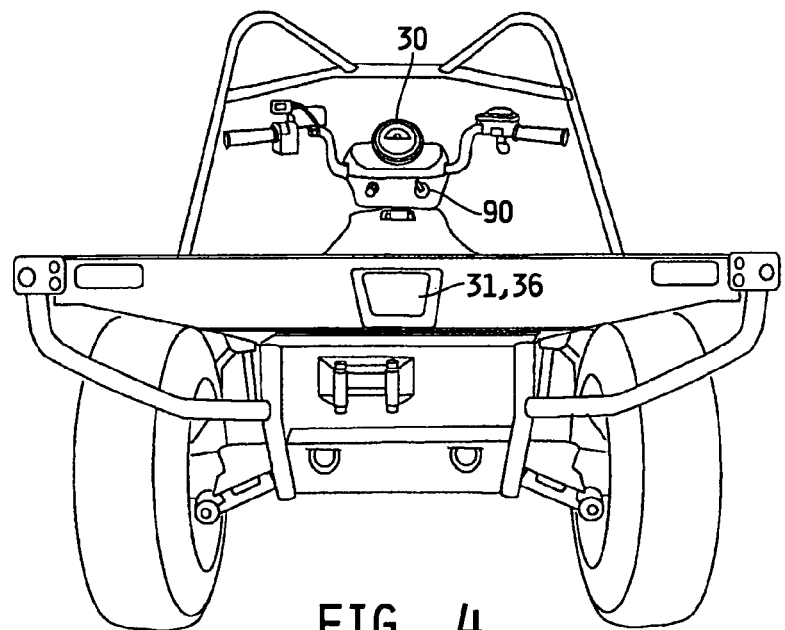
FIG. 4 is a rear profile view of an ATV according to an embodiment of the present invention.
Figure 8:
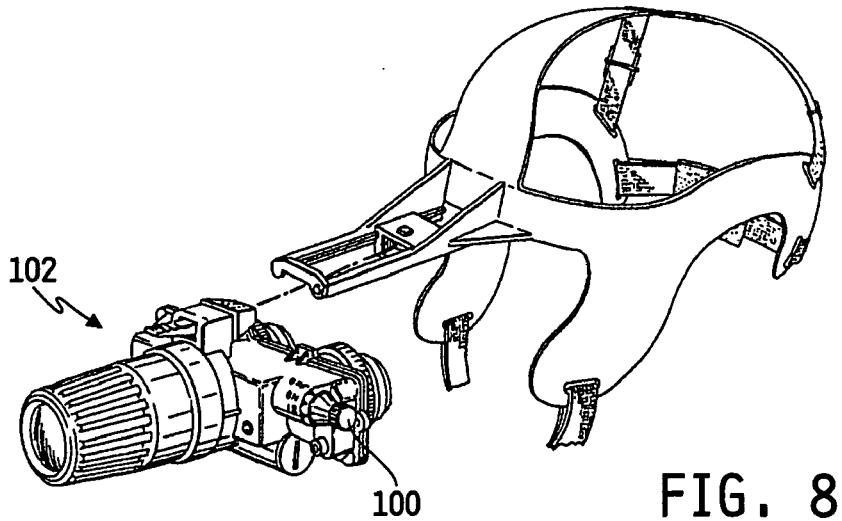
FIG. 8 is a perspective view of night vision goggles in an embodiment of the present invention.

With reference to FIG. 3, a front profile view of an ATV according to an embodiment of the present invention is shown. Generally speaking the present invention includes an ATV infrared lighting circuit 50 (see FIG. 7), which allows ATV 10 to switch from non-IR lighting to infrared lighting in low light environments, such as sun-set through sun-rise. For the purpose of this disclosure, non-IR lights and non-IR lighting are defined as all lighting, which can be seen without the need or use of night vision goggles or as lights producing visible light of wavelengths not primarily in the infrared light spectrum. More specifically, infrared lighting circuit 50 extinguishes all of the ATV's non-IR lights contemporaneously with the illumination of ATV IR light 40 (FIG. 5) for use with night vision goggles 102 (FIG. 8). For purposes of this disclosure, non-IR lights or lighting are ATV light sources generally including at least one of high beam light 32, low beam lights 34, instrument cluster light 30, taillight 31 (FIG. 4), and brake light 36 (FIG. 4), which are visible without the need for night vision goggles 102 or any other night vision imaging system. It is further contemplated any warning indicator lights or icons that illuminate when certain conditions are detected (e.g., low fuel, engine overheating, generator failure, etc.) would also be extinguished upon illumination of IR light 40. When ATV 10 is being operated in field conditions where it is desired to use infrared light for directional lighting instead of headlamps 32 or 34, such as in military or hunting applications, light circuit 50 allows the ATV operator to quickly convert to infrared directional lighting using IR light 40. In addition, circuit 50 contemporaneously extinguishes the non-IR lights on ATV 10. This allows the operator to turn on IR light 40 and put their night vision goggles 102 on without the concern of the ATV's non-IR lighting saturating the night vision goggles rendering them ineffective or useless. Circuit 50 also eliminates the need for the operator to place tape or other covering materials over any non-IR light originating from ATV 10, which not only can be ineffective (e.g., light can still escape around the cover) and unreliable (e.g., the cover can become dislodged or fall off), but also can take quite a bit of time to install. Therefore, the present invention simplifies the conversion to IR operation by completely extinguishing all other ATV non-IR lights. This aspect of circuit 50 is especially important in military applications where ATV 10 can be used in environments where stealth is very important if not essential to the safety of the operator. For example, ATV 10 operating in a stealth state would not have to worry about brake light 36 coming on inadvertently and giving away the operator's position or saturating the night vision goggles of an operator riding behind ATV 10 rendering this operator temporarily sightless, which can be dangerous to the operator regardless of the speed of the ATV.

Figure 3A:
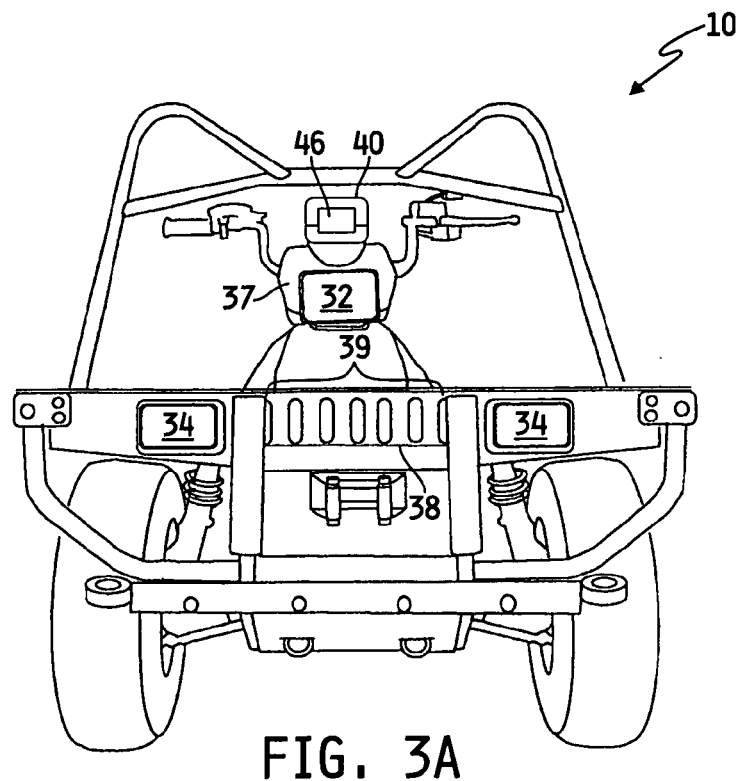
FIG. 3A is a front profile view of an ATV according to an embodiment of the present invention.
Figure 3B:
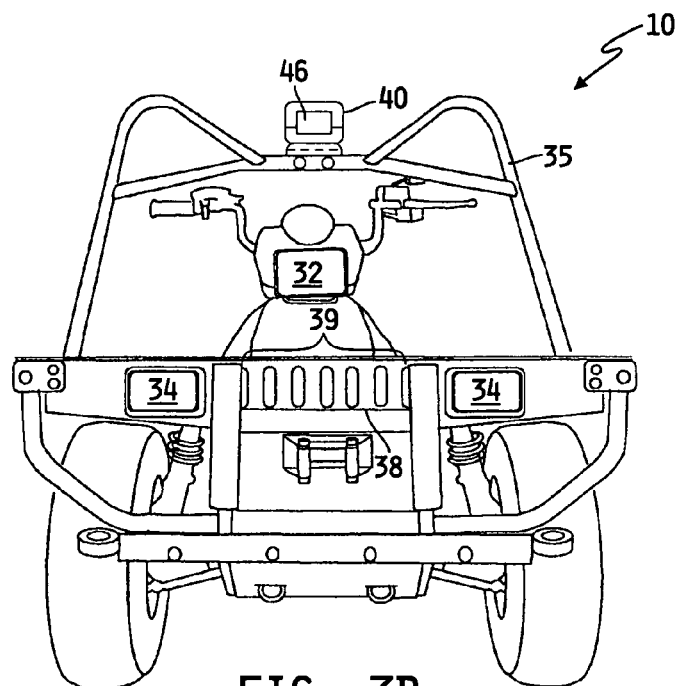
FIG. 3B is a front profile view of an ATV according to an embodiment of the present invention.

With reference again to FIG. 3, in one embodiment, IR light 40 is mounted behind rack 38 having a series of slots 39 located between headlamps 34. Rack 38 protects IR light 40 against damage from various obstacles in the path of ATV 10 and slots 39 allow for the infrared light to radiate out from ATV 10. In another embodiment, high beam light 32, low beam lights 34, instrument cluster 30, taillight 31, and brake light 36 could have a dual element light source to provide infrared light from all non-IR light sources. Therefore, when the operator initiates an IR light state, all non-IR light elements would be extinguished and infrared light elements would be powered up. In yet another embodiment, IR light 40 is mounted higher on ATV 10 to provide greater lighting distance of the ATV's path. IR light 40 could be mounted to provide greater lighting during turning or cornering of ATV 10. This could be accomplished by placing an infrared light source as a dual element source with high beam light 32 or IR light source 40 could be mounted on handlebar assembly 37 as shown in FIG. 3A. In another embodiment shown in FIG. 3B, IR light 40 is detachable and can be placed anywhere on ATV 10, such as on roll bar 35. The detachability of IR light 40 gives ATV 10 greater flexibility depending on the ATV's use. For example, if roll bar 35 is being used for storage of materials, IR light 40 can be moved to handlebar assembly 37 or to frame 42 (FIG. 5).

Figure 3C:
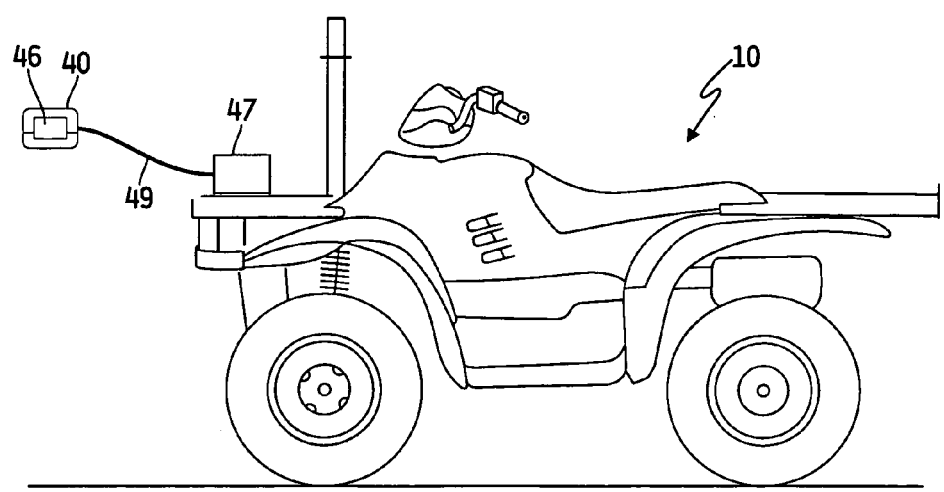
FIG. 3C is a side profile view of an ATV having an infrared light in an embodiment of the present invention.

With reference to FIG. 3C, a side profile view of an ATV having an infrared light in an embodiment of the present invention is shown. In this embodiment, IR light 40 is tethered to ATV 10 by cable 49. Cable box 47 would hold excess cable within its housing and wind cable 49 within cable box 47 as IR light 40 is brought back to ATV 10. This embodiment would allow the operator to detach IR light 40 from ATV 10 and manipulate IR light 40 however the operator chooses. When the operator is finished, IR light 40 is connected to cable box 47 or is mounted wherever the operator so desires as discussed above.

Figure 5:
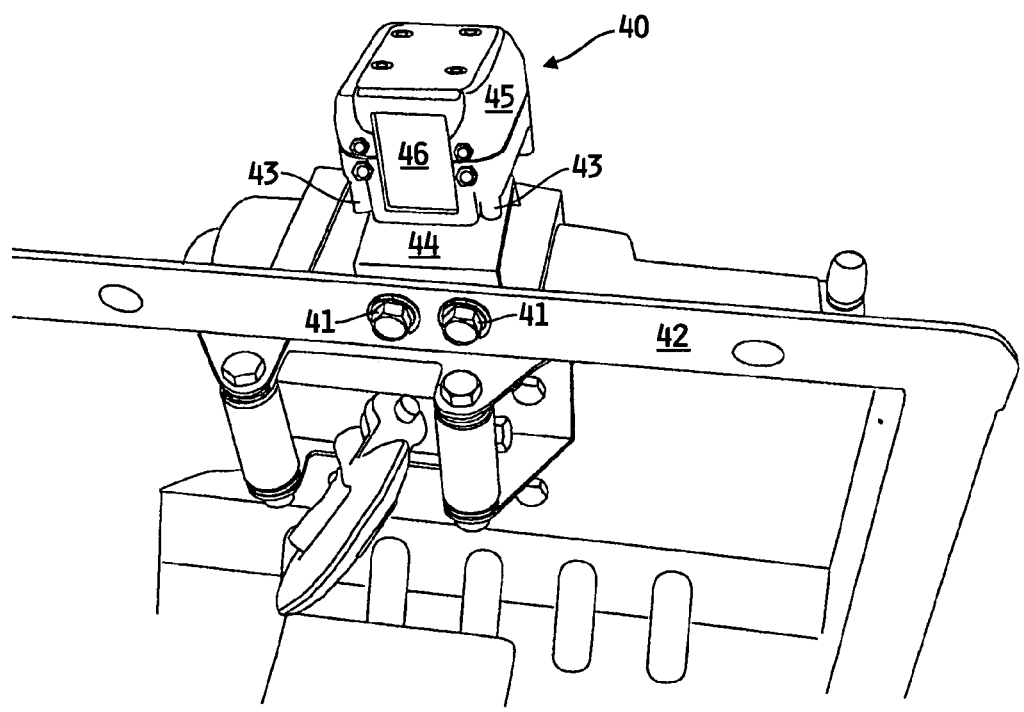
FIG. 5 is a front elevated view of an infrared light attached to an ATV in accordance with an embodiment of the present invention.

With reference to FIG. 5, a front elevated view of an infrared light attached to an ATV in accordance with an embodiment of the present invention is shown. In the present embodiment IR light 40 is mounted to ATV frame 42 with bracket 44. Bracket 44 is held to frame 42 with screw fasteners 41, which allow for easy detachability of IR light 40. It is contemplated bracket 44 could be welded to frame 42; however, bracket 44 would not be detachable. It is also contemplated bracket 44 could be fastened to frame 42 in any fashion, such as rivets, industrial glue, fastening clips, tie straps, etc. without departing from the spirit of the invention. IR light 40 is held to bracket 44 by screw fasteners (not shown). Two standoffs 43 on the left and right of lens 46 receive screw fasteners through bracket 44 and into the plastic of housing 45 to hold IR light 40 secure to bracket 44. Preferably, housing 45 is hermetically sealed to be waterproof so the light bulb is not damaged by moisture. However, it is contemplated housing 45 could be manufactured with rubber seals to make housing 45 waterproof and allow the operator to replace damaged light bulbs.

Infrared light is emitted through lens 46. A 12 volt/60-watt light bulb (not shown) provides the necessary light and lens 46 filters all non-infrared light radiation. However, it is contemplated a standard lens could be used with an infrared light source without departing from the spirit of the invention. In the present embodiment, only one IR light 40 is utilized, such as an infrared light source commercially offered by Hayes Diversified Technologies of Hesperia, Calif. Preferably, IR light 40 is made of a sturdy construction since ATVs often ride through rough terrain, which can pound out rubber mounting brackets within a standard light construction. Preferably, IR light 40 is made of a sturdy high-impact plastic with a compact construction of $2^{1/2}$ inches deep$\times 2^{1/2}$ inches wide$\times 2^{1/2}$ inches high. Therefore, IR light 40 doesn't consume a lot of room on ATV 10 and can be quickly detached and placed at another location on ATV 10 without much difficulty.

Regardless of the position of IR light 40, preferably, IR light 40 provides a good balance of light height and width so the operator can see an optimal distance in front of ATV 10 and to the left or right so the operator can see while turning. IR light 40 causes the light to be directed outward horizontally to satisfy FMVSS 108. FMVSS 108 stands for Federal Motor Vehicle Safety Standards section #108. Generally, IR light 40 can project light approximately 40 feet in front of ATV 10 and 20 feet to the left and right of the ATV 10. However, any infrared coverage is contemplated without departing from the spirit of the invention.

Figure 6:
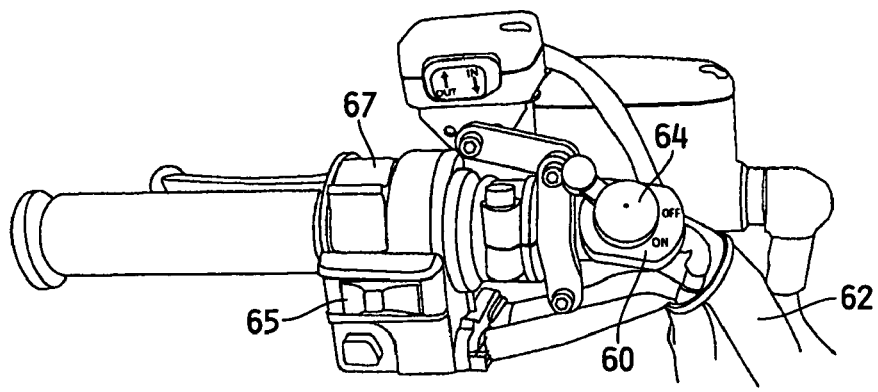
FIG. 6 is a front profile view of an infrared switch attached to an ATV in accordance with an embodiment of the present invention.

With reference to FIG. 6, a front profile view of an infrared switch attached to an ATV in accordance with an embodiment of the present invention is shown. IR switch 60 is located on left hand handle bar 62 of ATV 10, however, it is contemplated switch 60 could be located most anywhere on ATV 10 without departing from the spirit of the invention.

Switch 60 is located adjacent to engine switch 65 (discussed in more detail below) and headlight switch 67. Headlight switch 67 controls the power supplied to high beam light 32 and low beam lights 34. When the operator flips lever 64 into the IR "ON" position, as shown in FIG. 6, with his/her thumb, all non-IR lights are automatically extinguished and IR light 40 is powered up as will be discussed in more detail below. When the operator flips lever 64 into the IR off position, all non-IR lights are automatically powered up and IR light 40 is automatically extinguished.

Figure 6A:
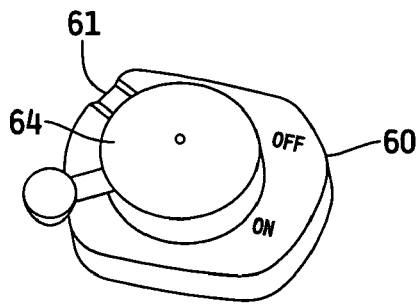
FIG. 6A is a front elevated view of an infrared switch in an embodiment of the present embodiment.

With reference to FIG. 6A, a front elevated view of an infrared switch in an embodiment of the present embodiment is shown. In this embodiment, switch 60 provides a catch 61 to lock toggle 64 when it is in the IR "ON" position. When the operator does slide toggle 64 into the "ON" position, toggle 64 drops into catch 61 and is prevented from moving from side to side. Thus, the operator would have to lift up on toggle 64 and push it back into the IR "OFF" position in order to go back to a non-IR light state. Therefore, the operator is prevented from accidentally bumping toggle 64 in rough terrain and prematurely coming out of an IR light state. This could be especially hazardous in military applications when stealth is required. Also, as will be discussed in more detail below, IR circuit 50 prevents the powering of any non-IR light. Therefore, the operator is unable to take ATV 10 out of an IR state by accidentally switching between high beam lights 32 and low beam lights 34.

Figure 7:
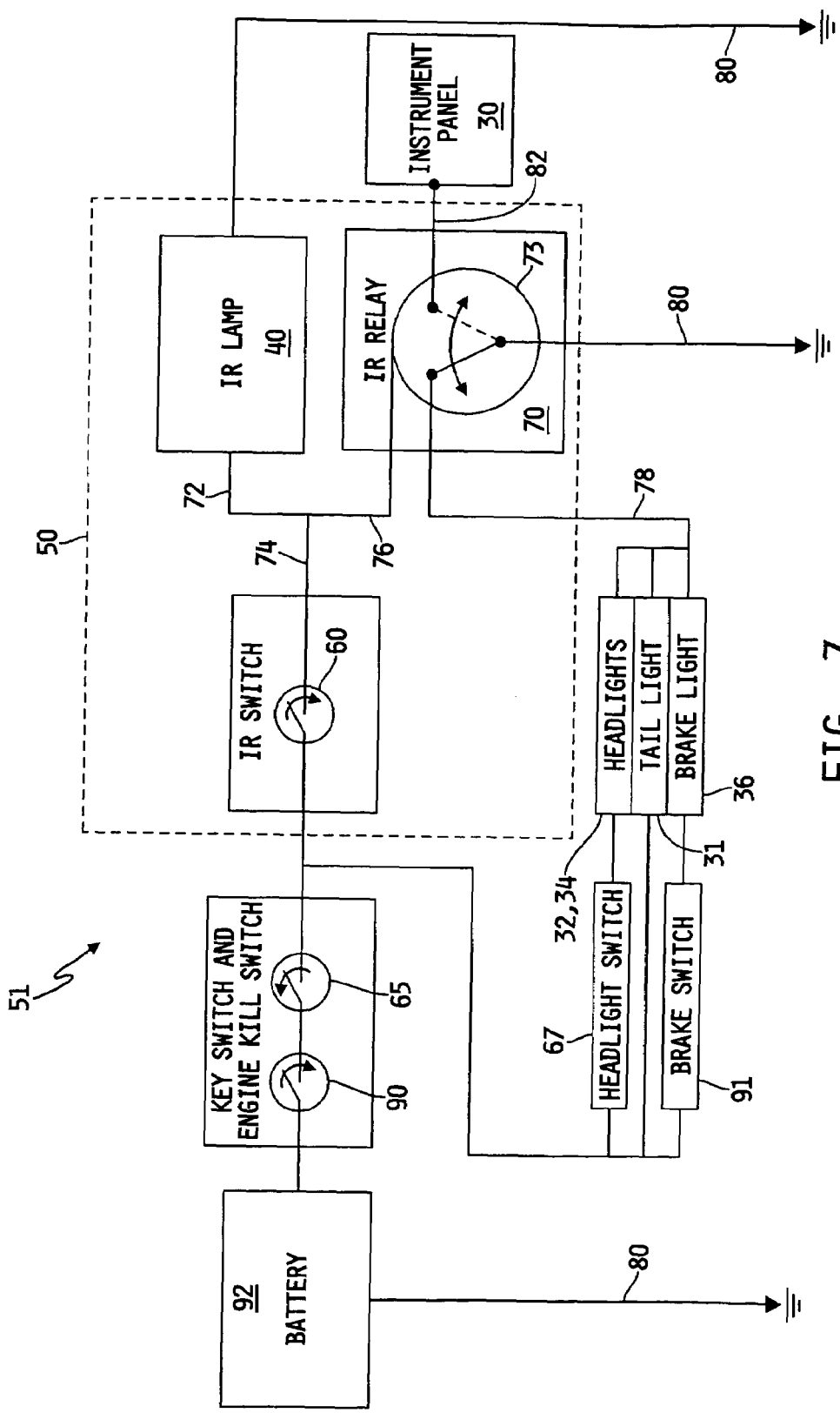
FIG. 7 is a schematic view of an infrared light circuit in an embodiment of the present invention.

With reference to FIG. 7, a basic schematic of an infrared light circuit in an embodiment of the present invention is shown. In the present embodiment IR circuit 50 has been added to a common vehicle lighting assembly 51. As shown in FIG. 7, a battery 92 or other power source routes DC voltage to key switch 90 and engine kill switch 65. The key switch 90 is open circuited (as indicated by the icon in FIG. 7) until an operator inserts and turns a key in switch 90 to operate the vehicle. The engine kill switch 65 typically remains closed unless the operator hits the switch to kill the vehicle ignition. Assuming switches 90 & 65 are both closed, the battery power is routed to IR circuit 50, and, in particular, to IR switch 60 and IR relay 70 to control the IR lamp illumination.

In ATV 10 of the present invention the ATV's motor 16 can be shut off via two methods. First, the operator can simply turn key switch 90 to the off (or open) position. Second, the operator can toggle engine kill switch 65 to the off (or open) position, which kills the ignition of engine 16. In either scenario, power to IR circuit 50 or the non-IR lights is cut off as shown in FIG. 7. This circuit design of the present embodiment prevents an operator from inadvertently draining battery 92 beyond usefulness. For example, if the operator leaves IR light 40 or headlights 32 or 34 on when he/she shuts off the engine, IR light 40 or headlights 32 and 34 will not continue to draw current from the power source 92 since switch 90 or 65 cuts off the current. Without this feature, a rider might possibly remove his/her night vision goggles during a low light period of the day before shutting off the engine and would not be able to see IR illumination indicating light 40 is left on. The operator can turn IR light 40 back on by returning key switch 90 and engine switch 65 to the "ON" position (with or without actually turning on engine 16). Therefore, if the operator wants IR light 40 turned on without engine 16 running, they can turn key switch 90 and engine switch 65 back to the "ON" (or closed) position and turn IR light 40 back on. Furthermore, the second operation of insuring either key switch 90 or engine switch 65 is in the "ON" position before IR light 40 is powered on, insures the operator is aware IR light 40 is on without engine 16 running.

Referring back to FIG. 7, IR switch 60 has ON and OFF positions. In the "OFF" position, this switch is open circuited. In the "ON" position, switch 60 closes, and power is routed to IR lamp 40 via line 72, causing lamp 40 to illuminate and project light of wavelengths primarily in the infrared region.

In the ON position, switch 60 also routes the battery voltage to IR relay 70 via line 76. Most of the non-IR lights are also routed through IR relay 70. In particular, headlights 32, 34, taillight 31, and brake light 36 have a common return path 78 that connects to switch 73 of relay 70. Non-IR light 31 connects to battery 92 through engine switch 65 and key switch 90. Headlights 32, 34 connect to battery 92 via a headlight switch 67, engine switch 65, and key switch 90. Brake light 36 connects to battery 92 via brake switch 91 (activated by squeezing the ATVs handle brake), engine switch 65, and key switch 90. Relay 70 includes switch 73, shown diagrammatically in FIG. 7. Switch 73 merely illustrates the connections made and broken by relay 70. The configuration of relay 70 to carry out these functions may differ from that diagrammed. Switch 73 is electronically controlled by control line 76, the output from IR switch 60. Switch 73 defaults to the position shown in FIG. 7 in the absence of a signal on control line 76. In its default position, relay switch 73 connects the common return line 78 for non-IR lights 32, 34, 31, and 36 to ground 80, completing the circuit for these lights and allowing them to produce non-infrared illumination. Instrument cluster 30 has separate power connections to battery 92 not shown. With switch 73 connected to ground 80, control line 82 of instrument panel 30 is left open-circuited by relay switch 73. In this position, instrument panel 30 operates normally, including illuminating any of its non-IR lights, such as the backlight that provides illumination for cluster 30.

In contrast to the default switch condition on relay 70, switch 73 automatically toggles to a second position when control line 76 provides the battery voltage to thereby activate the coil on relay 70. In its second position, switch 73 opens the return path 78 to ground 80, extinguishing any illumination of non-IR lights 32, 34, 31, and 36. In the second position, switch 73 connects control line 82 of instrument panel 30 to ground, thereby signaling to instrument panel 30 to shut off its non-IR lights, such as the backlight and possibly any warning indicator lights or icons that illuminate when certain conditions are detected (e.g., low fuel, engine overheating, generator failure, etc.).

Accordingly, as stated above, when IR switch 60 is switched on (or closed), all other non-IR lights (high beam 32, low beams 34, break light 36, taillight 31 and cluster 30) are switched off. When IR switch 60 is switched to the "ON" position (switch 60 is closed), infrared switch 60 provides positive battery power through line 74 to IR light 40 via line 72. Positive battery power is also applied to IR relay 70 via line 76 thereby activating relay 70. This opens switch 73 between line 78 and ground 80, thereby disabling headlights 32 and 34, taillight 31, and break light 36 at the same time connecting line 82 to ground 80 thus disabling the instrument cluster 30 illumination. Therefore, switch 60 removes positive voltage from headlights 32 and 34, taillight 31, and brake light 36 by removing the ground and thus there is no complete circuit for the non-IR lights and therefore no electricity can flow. Since line 82 is connected directly to ground 80, a short is created and thus instrument cluster 30 receives no voltage.

Figure 7A:
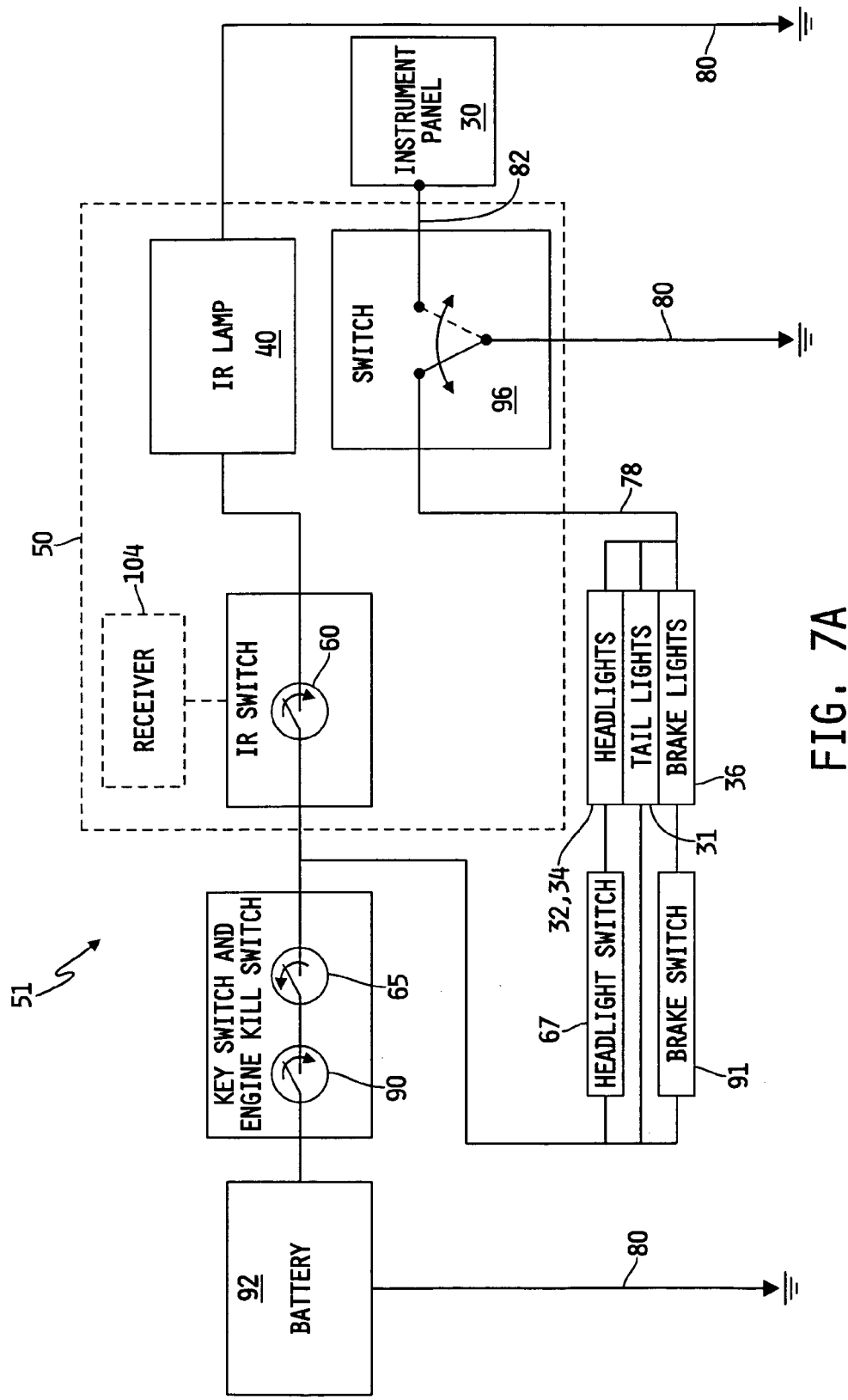
FIG. 7A is a schematic view of an infrared light circuit in an alternate embodiment of the present invention.

With reference to FIG. 7A, a schematic view of an infrared light circuit in an alternate embodiment of the present invention is shown. This embodiment operates similar to that shown in FIG. 7. Relay 70 is shown within IR circuit 50 in the preferred embodiments above. It is understood, however, that relay 70 could be replaced with other equivalent electronics, including transistors or other microelectronics. In addition, relay 70 could be replaced with manually controlled switches or a single switch. While such switches would not respond automatically when the IR light was illuminated to shut off the non-IR lights, they could be used to shut off all non-IR lights with one or two manual switches. For instance, switch 73 of relay 70 could each be comprised of manual, two-position switches similar to those used for switches 90, 65, 60 in FIG. 7 without any use of a control lead 76. Alternatively, switch 73 could be combined into a single, manual, two-position switch as shown in FIG. 7A. As shown in FIG. 7A, switch 96 connects ground lead 80 to either lead 78 (in a first switch position) or lead 82 (in a second switch position). That is, in the first position, this single switch 96 connects lead 78 to ground 80 while leaving lead 82 open. In the second position, this single switch connects lead 82 to ground 80 while leaving lead 78 open. Accordingly, in this embodiment, an operator would manually switch IR switch 60 to enable IR light 40 and would also manually toggle switch 96 to disable non-IR lights 32, 34, 31, and 36.

With reference to FIG. 8, a perspective view of night vision goggles in an embodiment of the present invention is shown. In this alternative embodiment, the operator is able to power on IR light 40 from night vision goggles 102. When the operator desires to go to an IR state, he/she would simply turn switch 100 to the "ON" position. A radio frequency (RF) signal would then be sent to infrared circuit 50. Receiver 104 would receive the signal and initiate the IR state as discussed above. This allows the operator to be away or remote from ATV 10 and yet still be able to turn IR light 40 on and the non-IR lights off thus going to an infrared state.

One skilled in the art will appreciate the present invention can be practiced with embodiments other than those disclosed. The disclosed embodiments are presented for purposes of illustration and not limitation, and the present invention is limited only by the claims follow.

What is claimed is:

1. A vehicle having an infrared lighting system for use with night vision viewing devices, comprising:
 a chassis carrying a straddle-type seat, at least one front wheel and at least one rear wheel suspended from the chassis, a handlebar assembly for steering the at least one front wheel, an engine carried by the chassis for powering the vehicle, a switch, an infrared light connected to the vehicle, and non-infrared lights connected to the vehicle including a headlight, the switch controlling the illumination of the non-infrared lights, and an infrared light switch that controls illumination of the infrared light.

2. A vehicle having an infrared lighting system for use with night vision viewing devices, comprising:
 a chassis carrying a straddle-type seat, at least one front wheel and at least one rear wheel suspended from the chassis, a handlebar assembly for steering the at least one front wheel, an engine carried by the chassis for powering the vehicle, a switch, an infrared light connected to the vehicle, and non-infrared lights connected to the vehicle including at least one of a headlight, a taillight, and an instrument cluster light, the switch controlling the illumination of the non-infrared lights, and an infrared light switch that controls illumination of the infrared light, wherein actuation of the switch extinguishes illumination of the non-infrared lights and activates illumination of the infrared light.

3. The vehicle of claim 2, wherein activation of the infrared light comprises completion of an electrical circuit connecting a vehicle power source and the infrared light.

4. The vehicle of claim 2, wherein extinguishing of the non-infrared lights comprises opening an electrical circuit connecting a vehicle power source and the non-infrared lights.

5. The vehicle of claim 1, wherein the switch is a relay.

6. The vehicle of claim 5, wherein the infrared light switch automatically actuates the switch that controls illumination of the non-infrared lights.

7. The vehicle of claim 1, wherein the switch is manually actuated.

8. A vehicle having an infrared lighting system for use with night vision viewing devices, comprising:
 a chassis carrying a straddle-type seat, at least one front wheel and at least one rear wheel suspended from the chassis, a handlebar assembly for steering the at least one front wheel, an engine carried by the chassis for powering the vehicle, a switch, an infrared light connected to the vehicle, and non-infrared lights connected to the vehicle including at least one of a headlight, a taillight, and an instrument cluster light, the switch controlling the illumination of the non-infrared lights, and an infrared light switch that controls illumination of the infrared light, wherein the infrared light provides illumination of oncoming terrain visible with the use of night vision viewing devices.

9. The vehicle of claim 1, wherein the infrared light illumination replaces the non-infrared light illumination of the oncoming terrain in response to the switch being moved from a first position to a second position.

10. The vehicle of claim 1, wherein the non-infrared lights produce visible light of wavelengths not primarily in the infrared light spectrum.

11. A vehicle having an infrared lighting system for use with night vision viewing devices, comprising:
 a chassis carrying a seat, an engine for powering the vehicle, and an infrared light switch, an infrared light positioned to illuminate an area in front of the vehicle, and one or more non-infrared lights carried by the vehicle and positioned to illuminate an area in front of the vehicle, the infrared light switch for controlling the illumination of the non-infrared lights and the infrared lights.

12. The vehicle of claim 11, wherein the infrared light source is detachably mounted to the vehicle.

13. The vehicle of claim 12, wherein the infrared light is tethered to the vehicle and moveable to a first position remote from the vehicle.

14. The vehicle of claim 11, wherein at least one of the one or more non-infrared lights comprise a high beam light, a low beam light, an instrument cluster, a taillight, and a brake light.

15. The vehicle of claim 11, wherein a dual element light source is carried by the vehicle and includes at least one of the one or more non-infrared lights and the infrared light.

16. The vehicle of claim 11, wherein the infrared light is housed in a waterproof housing.

17. The vehicle of claim 11, wherein the infrared light switch is further comprised of a catch to lock infrared switch in a closed position.

18. A vehicle having an infrared lighting system for use with night vision viewing devices, comprising:
a chassis carrying a seat, an engine for powering the vehicle, and an infrared light switch, an infrared light, and one or more non-infrared lights carried by the vehicle, the infrared light switch for controlling the illumination of the non-infrared lights and the infrared lights, and a relay electrically connected to the infrared light switch, when the light switch is closed the relay opens a ground switch, which extinguishes the one or more non-infrared lights.

19. The vehicle of claim 11, further comprising an engine switch and a key switch electrically connected to the infrared light switch, wherein the infrared light is extinguished when either of the engine switch or the key switch is toggled to an "OFF" position.

20. An all-terrain vehicle having an infrared lighting system comprising:
an infrared light switch, a lighting assembly having at least one non-IR light source and at least one infrared light source, the infrared light switch being electrically connected to the lighting assembly, when the infrared switch is toggled to an "ON" position electrical power is routed to the at least one infrared light source and power is removed from the at least one non-IR light source.

21. The all-terrain vehicle of claim 20, further comprising a headlight switch electrically connected to the infrared light switch, wherein power cannot be applied to the at least one infrared light source when the headlight switch is in the "OFF" position.

22. The all-terrain vehicle of claim 20, wherein the at least one infrared light source is detachably mounted to the vehicle.

23. The all-terrain vehicle of claim 22, wherein the at least one infrared light source is tethered to the vehicle and can be used remotely from the vehicle.

24. The all-terrain vehicle of claim 20, wherein the at least one non-IR light source comprises a high beam light, a low beam light, an instrument cluster, a taillight, and a brake light.

25. The all-terrain vehicle of claim 20 wherein the at least one non IR a dual element light source is carried by the vehicle and includes the at least one non-IR light source and the at least one infrared light source.

26. The all-terrain vehicle of claim 1, wherein the infrared light is housed in a waterproof housing.

27. The all-terrain vehicle of claim 20, wherein the infrared light switch is further comprised of a catch to lock infrared switch in closed position.

28. The all-terrain vehicle of claim 20, further comprising a relay electrically connected to the infrared light switch, when the light switch is closed the relay opens a ground switch, which extinguishes the at least one non-IR light source.

29. The vehicle of claim 8, wherein actuation of the switch extinguishes illumination of the non-infrared lights and activates illumination of the infrared light.

30. The vehicle of claim 18, further comprising an engine switch and a key switch electrically connected to the infrared light switch, wherein the infrared light is extinguished when either of the engine switch or the key switch is toggled to an "OFF" position.

31. The all-terrain vehicle of claim 2, wherein the infrared light is housed in a waterproof housing.

32. The all-terrain vehicle of claim 18, wherein the infrared light is housed in a waterproof housing.

33. The all-terrain vehicle of claim 20, wherein the at least one infrared light source is housed in a waterproof housing.

* * * * *